3,642,718
POLYMERS CONTAINING HYDROXYL GROUPS
Herbert Naarmann, Ludwigshafen, and Hans Kiefer, Wachenheim, Germany, assignors to Badische Anilin- & Soda-Fabrik Aktiengesellschaft, Ludwigshafen (Rhine), Germany
No Drawing. Filed Sept. 8, 1969, Ser. No. 856,203
Claims priority, application Germany, Sept. 11, 1968, P 17 95 312.7
Int. Cl. C08f 3/42, 15/14, 15/36
U.S. Cl. 260—78.3 U                                      9 Claims

ABSTRACT OF THE DISCLOSURE

Polymers containing tertiary hydroxyl groups, and their production by polymerizing unsaturated lactic acids or copolymerizing such acids with other olefinically unsaturated monomers.

---

The invention relates to polymers which contain tertiary hydroxyl groups and to their production by polymerization or copolymerization of unsaturated lactic acids.

It is known that polymers which contain carboxyl groups can be prepared in a simple way by polymerization or copolymerization of acrylic acid or methacrylic acid.

Many attempts have been made to prepare polymers containing hydroxyl groups by polymerizing vinyl compounds having hydroxyl groups. Unsaturated alcohols, such as allyl alcohol or buten-1-ol-3, however, cannot be polymerized to macromolecular compounds under conventional conditions, at the most low molecular weight oils are obtained. If an attempt is made to polymerize butane-(1,4)-diol monoacrylate, strongly cross-linked insoluble products are obtained. Polyvinyl alcohols can be prepared by the roundabout method of hydrolyzing polyvinyl esters.

The object of the present invention is to provide a process for the production of polymers containing hydroxyl groups and carboxyl groups in a simple manner.

We have now found that this object can be achieved by polymerizing an unsaturated organic acid containing hydroxyl groups and having the general formula:

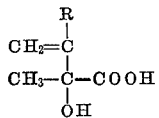

where R denotes a hydrogen atom or an alkyl group, with or without other olefinically unsaturated monomers in the presence of an initiator forming free radicals.

The polymers according to the invention are characterized by the grouping:

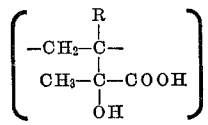

which is hereinafter referred to as (G).

Homopolymers contain this grouping (G) exclusively, apart from branch junctions formed by transfer reactions and terminal groups which consist of catalyst fragments. Copolymers may contain in the macromolecule not only the grouping (G) but also base units of polymers of other olefinically unsaturated monomers.

If terminal groups and possible branch junctions are disregarded, the following formula may be given to the polymers according to this invention:

—(X)$_l$—(G)$_m$—(Y)$_n$—

$l$, $m$ and $n$ being integers, the sum of $l+m+n$ being more than the 500. (G) has the meaning given above and (X) and (Y) are base units of polymers of olefinically unsaturated monomers which include the grouping (G) itself. Within a macromolecule, (X) may denote different base units which may be arranged in a regular or irregular sequence. The same is true of (Y).

These polymers are very reactive by reason of their hydroxyl groups and carboxyl groups. For example they may be esterified intermolecularly and thereby cross-linked; water may be eliminated intramolecularly by means of Lewis acids, which results in the formation of an unsaturated methylene group.

The monomers having the general formula which has been used for the homopolymers or copolymers according to the invention may be described as "unsaturated lactic acids." Vinyllactic acid and isopropenyllactic acid are particularly suitable. These are compounds having the above general formula where R denotes a hydrogen atom or a methyl group.

These unsaturated carboxylic acids may be prepared for example by reaction of vinyl ketone or isopropenyl ketone with hydrocyanic acid followed by hydrolysis of the cyanohydrins. The production of these unsaturated carboxylic acids is not the subject of this invention.

Suitable olefinically unsaturated monomers which may be copolymerized with the unsaturated lactic acids include olefins, such as ethylene, propylene, butadiene and isoprene; styrene and substituted styrenes such as p-chlorostyrene and p-methylstyrene; acrylic esters and methacrylic esters, particularly those having one to eighteen, preferably one to eight carbon atoms in the alcohol radical; acrylamide and methacrylamide and substituted amides, such as N-methylolacrylamide, N-methylolmethacrylamide or their ethers, such as N-methylolacrylamide butyl ether and N-methylolmethacrylamide methyl ether; acrylonitrile and methacrylonitrile; vinyl esters, such as vinyl acetate and vinyl propionate; vinyl ethers, such as methyl vinyl ether, ethyl vinyl ether or alkyl vinyl ethers having alkyl radicals containing three to six carbon atoms; as well as fumaric acid, maleic acid or itaconic acid; esters of these acids; and maleic anhydride. Two or more of these compounds may also be copolymerized at the same time with the unsaturated lactic acids.

Copolymers of ethylene, butadiene, styrene and acrylic esters of methanol, ethanol, propanol, butanol and ethylcyclohexanol with from 0.1 to 50%, preferably from 1 to 25%, of polymerized units of lactic acids, are of particular industrial interest.

Conventional free radical-forming initiators are used to initiate the polymerization. Examples of suitable initiators are hydrogen peroxide, organic hydroperoxides and peroxides, such as caproyl peroxide, benzoyl peroxide, lauroyl peroxide, tertiary-butyl perbenzoate, dicumyl peroxide, p-menthane hydroperoxide, cumene hydroperoxide, succinic peroxide, as well as aliphatic azo compounds which decompose into free radicals under polymerization conditions, such as 2,2'-azobis-2,4-dimethylvaleronitrile, 2,2' - azobisisobutyronitrile and analogous azonitriles which are set out for example in H. Hine, "Reaktivität und Mechanismus in der organischen Chemie," Georg Thieme Verlag, Stuttgart (1960), page 412, and conventional redox catalyst systems, such as potassium persulphate or ammonium persulphate and ascorbic acid, sodium hydrosulfite or iron(II) salts. Conventional chelates of transition metals, such as chelates of manganese (III), cobalt(III), copper(II) and cerium (IV) are also suitable as substances forming free radicals. Generally 1,3-dicarbonyl compounds are used as chelateforming substances. Examples are manganese(III) acetylcarbonate and cobalt(III) acetoacetic esters.

The initiators are generally used in an amount of from 0.05 to 5% by weight with reference to the amount of monomers. The optimal amount and the initiator having optimal effectiveness may easily be determined by preliminary experiment.

The polymerization may be carried out in bulk. It is advantageous however to use solvents or diluents. Examples of suitable solvents or diluents are alcohols, such as methanol, ethanol, propanol or butanol; ketones, such as methyl ethyl ketone or methyl propyl ketone; ethers, such as tetrahydrofuran or dioxane; aliphatic, cycloaliphatic or aromatic hydrocarbons, such as heptane, cyclohexane or benzene. Formamide and dimethylformamide are also very suitable.

Suspension, solution or emulsion polymerization methods conventionally used for a variety of other monomers or monomer mixtures are also suitable for the new process. The new process does not differ from prior art methods either as regards the optional use of auxiliaries, such as buffer substances, dispersing agents, protective colloids and the like.

Polymerization may be carried out within a wide temperature range, for example from 0° to 150° C., preferably from 50 to 120° C. Polymerization is generally carried out at atmospheric pressure but higher pressures may be used. The use of higher pressures is especially advisable when using comonomers having a low boiling point in order to bring about an adequate concentration of the comonomers in the reaction mixture.

Copolymerization of the unsaturated lactic acids with ethylene or butadiene is advantageously carried out in emulsion. The comonomers to be copolymerized with one another are introduced into an aqueous soap emulsion which contains an initiator, a buffer system and if desired a protective colloid, and polymerization is carried out at superatmospheric pressures of up to about 2000 atmospherese gauge. Copolymerization with acrylic esters is advantageously carried out in aromatic or aliphatic hydrocarbons under the conditions known for the polymerization of acrylic esters.

The polymers may be used for example for the production of moldings, coatings or adhesives, as well as in admixture with other plastics, for example with polyethylene, polypropylene, or with copolymers of vinyl acetate. Owing to their content of —OH and —COOH groups, such products exhibit dye affinity. The polymers prepared according to the invention are suitable, inter alia, for improving paper and textiles owing to their surface-active and antistatic properties.

Copolymers with acrylic esters are of particular industrial interest. These polymers contain —OH groups in the lactic acid components and —OR groups in the acrylic ester components. At temperatures above 100° C. these may react by intermolecular transesterification with the elimination of ROH. Crosslinked sites are thus formed. These substances are therefore soluble high molecular weight compounds which can be crosslinked without adding crosslinking agents at fairly low temperatures and which can be mixed with pigments. Such substances are eminently suitable as surface coatings.

Water can be eliminated intramolecularly from copolymers of ethylene or styrene with unsaturated lactic acids at temperatures above 100° C. under the catalytic influence of Lewis acids. Polymers are formed which contain unsaturated methylene groups. Olefinically unsaturated monomers can be grafted onto these products; in this case soft or hard components for impact-resistant compositions are obtained.

The invention is illustrated by the following examples. The parts and percentages specified in the examples are by weight.

EXAMPLE 1

K values are determined in each case 1% in dimethylformamide according to H. Fikentscher, Cellulosechemie 13, 58 (1932).

Ethyl acrylate and vinyllactic acid are mixed in specific ratios, 0.1% by weight of azobisisobutyronitrile is added in each case and the whole is heated for two hours at 70° C. The copolymer is precipitated with methanol, washed with methanol and dried in a vacuum drying cabinet for ten hours at 60° C. and 12 mm. Hg. The results obtained are given in the following table in which:

EA = amount in parts of ethyl acrylate
VL = amount in parts of vinyllactic acid
CON = conversion in percent
KV = K value
O% = amount of oxygen in percent
VL% = fraction (in percent by weight) of vinyllactic acid in the copolymer

| No. | EA | VL | CON | KV | O, percent | VL percent |
|---|---|---|---|---|---|---|
| a | 9.9 | 0.1 | 100 | 61 | 0.4 | 1 [1] |
| b | 9.5 | 0.5 | 100 | 61.5 | 2.1 | 5 |
| c | 9.0 | 1.0 | 96 | 60 | 4.1 | 9.9 |
| d | 8.5 | 1.5 | 95 | 59.5 | 6.1 | 14.7 |
| e | 8.0 | 2.0 | 95 | 56 | 8.0 | 19.4 |
| f | 7.0 | 3.0 | 90 | 53 | 11.9 | 28.8 |
| g | 6.0 | 4.0 | 75 | 49 | 15.2 | 36.8 |
| h | 5.0 | 5.0 | 68 | 49.5 | 15.3 | 37.0 |
| i | 4.0 | 6.0 | 51 | 44 | 15.1 | 36.6 |
| j | 2.5 | 7.5 | 43 | 41 | 15.0 | 36.3 |
| k | 1.0 | 9.0 | 35 | 37.5 | 15.1 | 36.6 |

[1] Approximately.

EXAMPLE 2

50 parts of toluene and 0.1 part of p-toluenesulfonic acid are added to 50 parts of the product of Example 1c (copolymer of ethyl acrylate with 9.9% of vinyllactic acid). This solution is brushed onto a metal sheet and heated for thirty minutes at 125° C. Transesterification takes place with elimination of ethyl alcohol.

The coating obtained is clear and insoluble in acetone or toluene.

EXAMPLE 3

The procedure of Example 1i is followed, but the acrylic ester is replaced by acrylonitrile. A conversion of 89% is achieved; the product has a K value of 66 and a content of 3.2% by weight of polymerized units of vinyllactic acid.

EXAMPLE 4

30 parts of isopropenyllactic acid is mixed with 2 parts of sodium pyrophosphate, 1.5 parts of potassium persulfate, 2 parts of the sodium salt of dodecanol sulfonic acid and 1000 parts of water. Butadiene is pressed into this mixture in an autoclave at 90° C., while stirring, in such an amount that the butadiene pressure in the gas space is 6 atmospheres gauge.

After a reaction period of eight hours, the dispersion has a solids content of 25.8% by weight. The copolymer has a content of 18.6% of isopropenyllactic acid and a K value of 76.

EXAMPLE 5

(a) The procedure of Example 4 is followed, but the butadiene is replaced by ethylene.

After the reaction period of eight hours at an ethylene pressure of 235 atmospheres gauge, a dispersion is obtained having a solids content of 21% by weight. The K value of the polymer is 46 (1% in decahydronaphthalene). The content of isopropenyllactic acid units is 9.6%.

(b) 100 parts of this copolymer has 900 parts of toluene and 0.5 part of p-toluenesulfonic added to it and it is boiled for five hours under reflux. 2 parts of water is thus eliminated. The product obtained reacts with iodine, has a hydrogenation iodine number of 21 and exhibits double bond bands in the infrared spectrum.

(c) 10 parts of the copolymer containing double bonds is dissolved in 90 parts of toluene. 30 parts of styrene, 10 parts of acrylonitrile and 1 part of azodiisobutyronitrile (as initiator) are added and the whole is heated at 112° C. Three hours later the grafting reaction is over and the solvent is removed. An impact-resistant thermoplastic having outstanding age resistance is obtained.

EXAMPLE 6

(a) The procedure of Example 4 is followed, but the butadiene is replaced by 270 parts of styrene. After eight hours, 300 parts of a copolymer is obtained having a K value of 56 (0.5% in toluene) and containing 10% of isopropenyllactic acid.

(b) Water is eliminated as in Example 5(b). A product is obtained which contains double bonds and can be grafted preferably with butadiene and acrylonitrile.

(c) 10 parts of this copolymer is dissolved in 90 parts of toluene. 25 parts of butadiene, 25 parts of acrylonitrile and 1 part of azodiisobutyronitrile are added and the whole is heated for two hours at 90° C. After removal of the solvent a graft polymer is obtained which can be vulcanized by conventional methods, and gives a rigid elastomeric plastic.

We claim:
1. A process for the production of polymers containing tertiary hydroxyl groups wherein an unsaturated organic acid having the general formula:

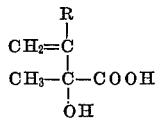

where R denotes a hydrogen atom or methyl group is polymerized with a free radical-forming initiator.

2. A process as claimed in claim 1 wherein the said unsaturated organic acid is copolymerized with one or more other olefinically unsaturated monomers.

3. A process as claimed in claim 1 wherein vinyllactic acid is used as the unsaturated organic acid.

4. A process as claimed in claim 1 wherein isopropenyllactic acid is used as the unsaturated organic acid.

5. A process as claimed in claim 1 wherein a copolymer is prepared from ethylene and from 1 to 25% by weight (with reference to the mixture) of an unsaturated organic acid having the said general formula.

6. A process as claimed in claim 1 wherein a copolymer is prepared from butadiene and from 1 to 25% by weight (with reference to the mixture) of an unsaturated organic acid having the said general formula.

7. A process as claimed in claim 1 wherein a copolymer is prepared from styrene and 1 to 25% by weight (with reference to the mixture) of the unsaturated organic acid having the said general formula.

8. A process as claimed in claim 1 wherein a copolymer is prepared from an acrylic ester and from 1 to 25% by weight (with reference to the mixture) of an unsaturated organic acid having the said general formula.

9. A process as claimed in claim 1 wherein the polymerization is carried out in the presence of from 0.05 to 5% by weight (with reference to the monomers) of an initiator.

References Cited

UNITED STATES PATENTS 2,559,635  7/1951  Kenyon _____ 260—85.5
2,728,746  12/1955  Unruh _____ 260—78.3

OTHER REFERENCES

Dermer, O. C. et al., Chem. Abst., 3246(d), 1954.

85.5 ZA, 85.7 R, 86.1 R, 88.1 PC, 879, 881, DIG 17, 117—122 R, 132 R, 132 CB; 260—78.5 R, 80.3 E, 80.3 N, 535 R

JOSEPH L. SCHOFER, Primary Examiner

C. A. HENDERSON, Jr., Assistant Examiner

U.S. Cl. X.R.